United States Patent
Gurfinkel et al.

(10) Patent No.: US 8,683,323 B2
(45) Date of Patent: Mar. 25, 2014

(54) EVALUATION OF DIFFERENCES BETWEEN XML SCHEMAS

(75) Inventors: Oren Gurfinkel, Rishon Le-zion (IL); Oleg Verhovsky, Ashkelon (IL); Malcolm Victor Isaacs, Modi'in (IL); Yaron Naveh, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 135 days.

(21) Appl. No.: 13/346,390

(22) Filed: Jan. 9, 2012

(65) Prior Publication Data
US 2013/0179769 A1 Jul. 11, 2013

(51) Int. Cl.
*G06F 17/00* (2006.01)

(52) U.S. Cl.
USPC ............ 715/234; 715/250; 715/273; 715/760

(58) Field of Classification Search
USPC ......... 715/204, 205, 226, 234, 255, 256, 273, 715/700, 760
See application file for complete search history.

(56) References Cited

U.S. PATENT DOCUMENTS

| | | | |
|---|---|---|---|
| 7,512,840 B2 | 3/2009 | Martin et al. | |
| 7,603,654 B2 * | 10/2009 | Kharitidi et al. | 717/106 |
| 7,630,956 B2 | 12/2009 | Wyatt et al. | |
| 7,721,193 B2 * | 5/2010 | Upton | 715/234 |
| 7,890,659 B2 | 2/2011 | Pasha et al. | |
| 2003/0182452 A1 * | 9/2003 | Upton | 715/513 |
| 2004/0098667 A1 * | 5/2004 | Atkinson | 715/513 |
| 2004/0194016 A1 * | 9/2004 | Liggitt | 715/501.1 |
| 2005/0060645 A1 * | 3/2005 | Raghavachari et al. | 715/513 |
| 2005/0192990 A1 * | 9/2005 | Kharitidi et al. | 707/101 |
| 2006/0075387 A1 * | 4/2006 | Martin et al. | 717/124 |
| 2008/0082560 A1 * | 4/2008 | Agrawal et al. | 707/101 |
| 2009/0063952 A1 * | 3/2009 | Raghavachari et al. | 715/234 |

OTHER PUBLICATIONS

"Security Based Heuristic SAX for XML Parsing"; Wei Wang; 2007.
"Holistic Constraint-preserving Transformation from Relational Schema into XML Schema"; Zhou et al.; 2008.

* cited by examiner

*Primary Examiner* — Maikhanh Nguyen

(57) ABSTRACT

A method includes obtaining a first XML schema and a second XML schema. One or more schema objects of each of the first XML schema and the second XML schema are identified. An identified schema object of the first XML schema is compared with an identified schema object of the second XML schema. If a difference is detected between the compared schema objects, a risk of the detected difference affecting operation of a composite application incorporating the first schema or the second schema is evaluated. A notification of the evaluated risk is issued.

18 Claims, 2 Drawing Sheets

EVALUATION OF DIFFERENCES BETWEEN XML SCHEMAS

BACKGROUND

A composite application may be based on applications or services that were developed separately. Composite application development may involve orchestrating the various individual applications and services. For example, a service that involves interactions between a bank and a bank customer may be coordinated with an application that involves interactions between the bank and external bodies (e.g. another bank or a credit company). Each separate application may handle or define data differently. For example, one application may define an identification number or credit card number as a character string and handle it accordingly (e.g. by performing string operations on the number, such as character extraction or concatenation). Another application, may, however, define the same identification number as an integer and treat it accordingly (e.g. by performing mathematical operations on the number, e.g. to verify validity of the number by calculating a checksum). The composite application may be designed to coordinate between the various applications. This coordination may be referred to as a data contract.

Integration between application components may include multiple systems implemented by different vendors, belonging to separate organizations, or deployed on a network and used on demand. Responsibility for these systems may fall to different organizations, which may be geographically separated from one another.

An application (e.g. a user interface or online form for interacting with a user) may be structured as a document that is defined in terms of Extensible Markup Language (XML) schema. For example, the application may be defined in terms of a language such as XSD (XML Schema Definition).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

Figure 1:
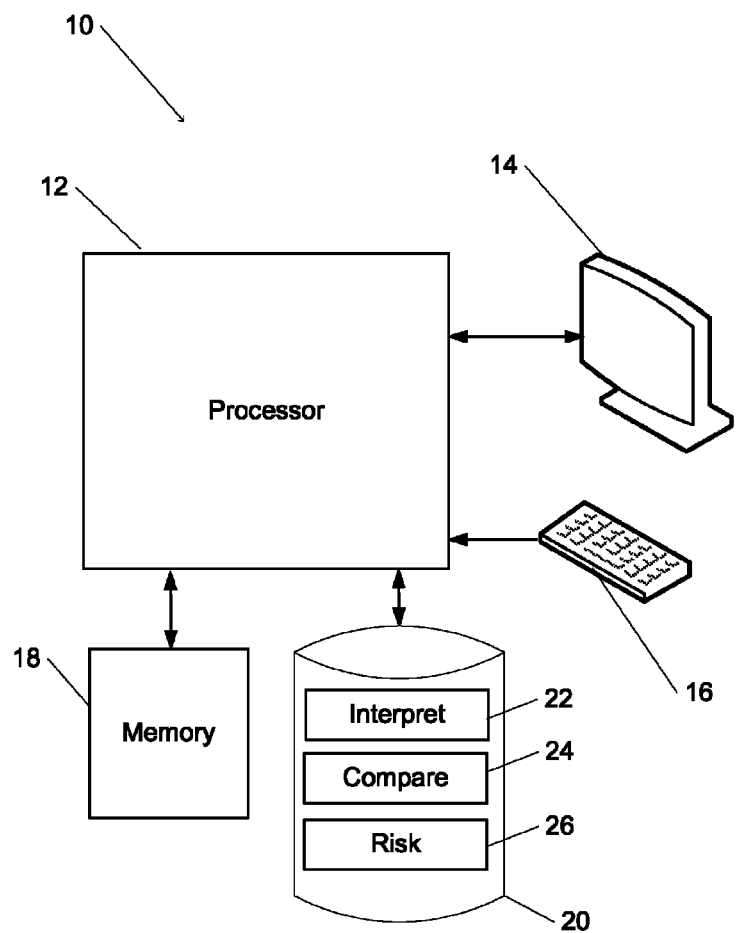
FIG. 1 shows an example of a system for automatic evaluation of modifications in XML schemas.

In accordance with an example of automatic evaluation of modifications in XML schemas, a software tool is provided to detect and evaluate differences between a first (e.g. original version of an) XML schema, and a second (e.g. modified version of the) XML schema. A detected difference between the XML schemas and an evaluation of the difference may be reported to a user (e.g. a quality assurance profession, or an application tester or test manager). For example, an evaluation may label a detected difference as high, medium, or low risk, or provide an appropriate score or grade. The label, score, or grade may indicate to the user a likelihood that the detected difference will result in inconsistency within a composite application. For example, inconsistency may include a conflict between a modified XML schema and other applications within the composite application if the modified XML schema is integrated into the composite application.

For example, a quality assurance or test manager may be responsible for testing integration of hundreds of applications or services of a composite application. Regression testing of the composite application could take weeks or months. After or during testing, a developer of one the applications may introduce a modification in that application. From the point of view of the developer, the modification may be considered small or cosmetic (e.g. a modification in data format or a rename). However, such a modification may result in failure of the modified application to integrate properly into the composite application. In such a case, an example of automatic evaluation of modifications in XML schema may assist the manager in deciding whether repeat testing is necessary.

In accordance with an example of automatic evaluation of modifications in XML schemas, an original version and a modified version of XML schema may be logically interpreted to identify logical schema elements, herein referred to as schema objects.

The identified logical schema objects in the XML schema may be compared. For example, schema objects may be compared by object name. Thus, an object name may be found to appear in both the original and modified versions, or only in one or the other. Thus, if an object name is present in the modified version but not in the original version, the object name may be reported as new, added, or renamed. Similarly, if an object name is present in the original version but not in the modified version, the object name may be reported as removed or missing.

If an object name is identified in both the original and modified versions in the XML schema, elements of the associated schema objects may be compared. Differences between the schema object in the original and modified versions may be identified.

Any identified differences between a schema object in the original and modified versions in the XML schema may be evaluated. For example, implications of a modified schema object with respect to other schema objects (due to property inheritance) may be examined. A modification may also be examined in accordance with a set of rules that may be configured by the user.

Automatic evaluation of modifications in XML schemas as described herein may be advantageous. Such automatic evaluation may assist a user in identifying those modifications that could result in impaired operation of a composite application. The user may thus be assisted in distinguishing between modifications that have little risk of affecting operation, and those with greater risk of affecting operation.

Detecting and evaluating modifications by working with identified schema objects in accordance with an object model as described herein may be advantageous. On the other hand, in accordance with some prior art methods of automatically detecting such modifications, modifications could be identified by comparison of strings in the original and modified versions of the XML schema. A user could thus be alerted regarding a modification, whether or not the modification in the document could lead to a change in functionality. Such unnecessary alerting could make the process of reviewing XML schema more tedious.

A system may be configured to automatically evaluate modifications in an XML schema. For example, the system may include a computer, or a group of intercommunicating computers.

FIG. 1 shows an example of a system for automatic evaluation of modifications in XML schemas.

System 10 for automatically evaluating a modification of an XML data contract includes a processor 12. Processor 12 may include one or more processing units, e.g. of one or more computers. Processor 12 may be configured to operate in accordance with programmed instructions stored in memory 18. Processor 12 may be capable of operating in accordance with the programmed instructions so as to execute an application for automatic evaluation of modifications in XML schema.

Processor 12 may communicate with output device 14. For example, output device 14 may include a computer monitor or screen, or other display device. In another example, output device 14 may include a printer, display panel, speaker, or another device capable of producing visible, audible, or tactile output.

For example, processor 12 may communicate with a screen of output device 14 to display XML schema, or an evaluation of a modification of XML schema.

Processor 12 may communicate with input device 16. For example, input device 16 may include one or more of a keyboard, keypad, or pointing device for enabling a user to input data or instructions for operation of processor 12.

Processor 12 may communicate with memory 18. Memory 18 may include one or more volatile or nonvolatile memory devices. Memory 18 may be utilized to store, for example, programmed instructions for operation of processor 12, data or parameters for use by processor 12 during operation, or results of operation of processor 12

Processor 12 may communicate with data storage device 20. Data storage device 20 may include one or more fixed or removable nonvolatile data storage devices. For example, data storage device 20 may include a computer readable medium for storing program instructions for operation of processor 12. Such instructions may include, for example, an interpret module 22 for interpreting XML schema to identify schema objects, a compare module 24 for detecting differences between schema objects of different XML schema (e.g. of an XSD document prior to and after modification), and risk evaluation module 20 for evaluating a risk that is associated with a detected difference. Data storage device 20 may be utilized to store data or parameters for use by processor 12 during operation, or results of operation of processor 12.

Data storage device 20 may represent a data storage device that is remote from processor 12. For example, data storage device 20 may represent a storage device of a remote server storing interpret module 22, compare module 24, or risk evaluation module 20 in the form of an installation package or packages that can be downloaded and installed for execution by processor 12.

Processor 12 may be configured to execute an example of a method of automatic evaluation of modifications in XML schemas. Execution of such a method may be initiated, for example, by a user operating input device 16, or automatically by another application (such as an application for editing XSD documents).

Figure 2:
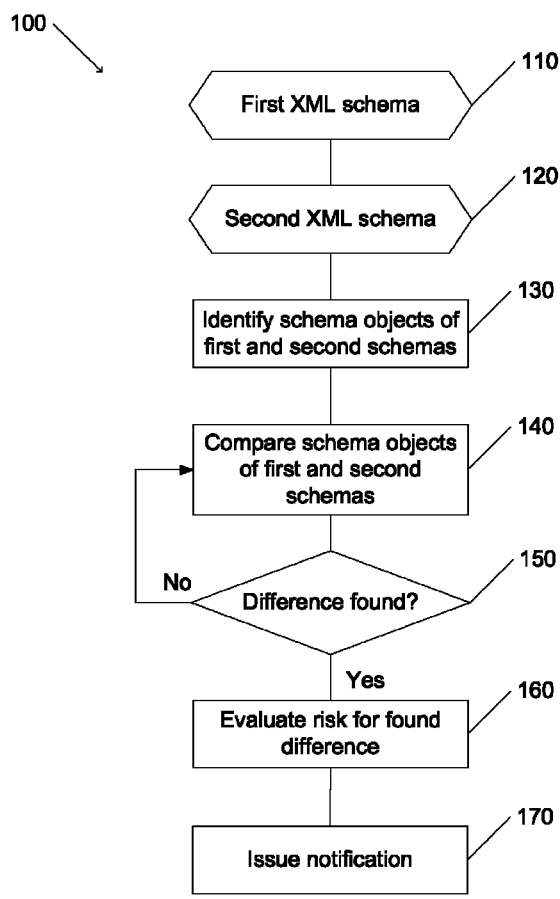
FIG. 2 is a flowchart depicting an example of a method of automatic evaluation of modifications in XML schemas.

FIG. 2 is a flowchart depicting an example of a method of automatic evaluation of modifications in XML schemas.

It should be understood with respect to the flowchart that the division of the illustrated method into discrete operations each depicted by a block of the flowchart has been selected for convenience and clarity only. Alternative division of the depicted method into discrete operations is possible with equivalent results. Any such alternative division of the depicted method into discrete operations should be understood as representing another example of the depicted method.

Similarly, it should be understood that, unless indicated otherwise, the illustrated order of execution of the operations as represented by blocks of the flowchart has been selected for convenience and clarity only. Operations of the depicted method may be executed in an alternative order, or concurrently, with equivalent results. Any such reordering of operations of the depicted method should be understood as representing another example of the depicted method.

Automatic modification evaluation method 100 may be performed on two XML schemas that are to be compared. One of the XML schemas is herein referred to as a first XML schema (block 110), e.g. representing an original version of an XML schema.

The other XML schema is referred to a as a second XML schema (block 120), e.g. representing a modified version of the first XML schema. For example, automatic modification evaluation method 100 may be executed on Web Services Description Language (WSDL) or Web Application Description Language (WADL) descriptions that contain XML schema or reference XSD documents.

Execution of automatic modification evaluation method 100 may be initiated by a user. For example, the user may include a person who is responsible for quality assurance or integration of a composite application. Execution of automatic modification evaluation method 100 may be automatically initiated by another application. Such other applications may include, for example, an application for editing an XSD document.

The XML schema may be interpreted to identify schema objects block 130). A core component or module may identify schema objects in each of the XML schema for comparison with one another. A schema object may include, for example, an element or type that is defined in the schema.

For example, the core module may incorporate an application such as XML Schema Object Model (SOM). SOM may be applied to XSD schemas in a document and return a set of one or more schema objects. For example, the schema objects may be defined as classes. A typical schema object is identified by a name of the object and a type of object, and may be characterized by attributes. Another application capable of generating logical entities from XSD schema may be applied instead of, or in addition to, SOM.

Each identified schema object of the first XML schema may be compared to the identified schema objects of the second XML schema (block 140). For example, identified schema objects of an original version of the XML schema may be compared to identified schema objects of the modified version of the XML schema. One or more types of comparisons may be performed.

For example, one type of comparison may attempt to match each schema object name in an original version of a XML schema with an identical name of a schema object in a modified version of the XML schema. Such a comparison may indicate any schema objects that are present in the original version but are absent in the modified version (e.g. had been deleted or renamed in modifying an XSD document).

Similarly, a comparison may attempt to match each schema object name in the modified version of the XML schema with an identical name of a schema object in the original version of the XML schema. Such a comparison may indicate any schema objects that are present in the modified XML version but are absent in the original version (e.g. had been added in modifying an XSD document).

A match may be found between a schema object name in the original version of the XML schema and a corresponding schema object name in the modified version of the XML schema. One or more comparisons may be applied to the two corresponding schema objects. Such comparisons may be referred to collectively as pattern matching.

The pattern matching may accord with definitions of entities as specified by the World Wide Web Consortium (W3C).

Pattern matching may include an element comparison. The element comparison may compare a name and a type of a defined element in both the original and the modified versions of the XML schema. If one or both are changed, a decision may be made as to whether the modification represents renaming of an otherwise identical element, a change in type of the element (e.g. from integer to character string), or a new element. The element comparison may include comparing attributes of the element (e.g. occurrence constraints).

Pattern matching may include a sequence comparison for comparing sequences of elements, e.g. as specified by W3C. The pattern matching may include an enumeration facet comparison for comparing entities to which values have been assigned, e.g. via the enumeration facet as specified by W3C. Pattern matching may include comparison of simple types (e.g. integer or string) or complex types (e.g. involving several simple types).

Pattern matching may be configured to determine the most appropriate comparison to be applied. A comparison module (or comparer) may be linked to other comparers so as to invoke one of the linked comparers as needed. For example, a linkage or sequence of comparers may be based on a chain of responsibility patterns or an inheritance hierarchy. Such a comparison design may be extensible to support other schema patterns.

The comparison may find a difference between schema objects in the first and second XML schemas (block 150). For example, a difference may be found between schema objects of original and modified versions of an XML schema. The difference may be reported to a user. For example, a comparison between the XML schemas may be displayed on a screen. Regions of the XML schemas that resulted in the found difference may be highlighted or otherwise indicated in the display. The XML schemas or the differences may be saved in a repository (e.g. on a data storage device).

A risk that is associated with the found difference may be evaluated (block 160). A risk may be in the form of a score, grade, or designation that indicates the likelihood that the found difference may affect operation of a composite application or other application of which the XML schema is a component. For example, the evaluated risk may be displayed or otherwise presented to a user together with an indication of the associated found difference. The evaluated risk may be indicated by decorating (e.g. by shading, coloring, or font) a displayed list of found differences.

For example, a risk may be evaluated in accordance with a set of predetermined rules. Such rules may be generated by a developer of an application that is configured to implement or execute automatic modification evaluation method 100. Such rules may be modifiable by, or generable by, a user of the system. For example, a user interface may be provided whereby a user may assign a risk or relative risk to different types of differences. (Application of such rules is illustrated by examples below.)

A risk may be evaluated in accordance with the extent of the effect of the difference, e.g. in an inheritance tree. For example, a schema object that is affected by a difference may inherit properties from another object. A difference that affects one or more schema objects that are derived (inherit) from the schema object under consideration may be assigned a higher risk than a difference that affects only a single schema object.

For example, a schema object may define a type. The defined type may inherit one or more properties from one or more other types (super types). Similarly, one or more other types may inherit properties from the defined type (derived types). A detected difference that affects one or more super types or derived types may be evaluating as presenting a greater risk than a detected difference that affects fewer or no derived types or super types.

A notification may be issued (block 170). The notification may include a display of the detected difference (e.g. a representation of the corresponding schema objects, of the corresponding XML schemas, or both), a display of the evaluated risk (e.g. a verbal description or corresponding numerical scale), or both. For example, a display of the two XML schemas may highlight or otherwise indicate the detected difference, may indicate the nature of the detected difference (e.g. as related to the schema objects), or may indicate an evaluated risk that is associated with the detected difference.

If no differences are found, other identified pairs of schema objects in the first and second XML schema may be compared (returning to the operation indicated by block 140).

Application of automatic modification evaluation method 100 to original and modified versions of an XML schema may be understood by consideration of some examples.

Consider a first example of a modification where code was fragmented without any changes to the metadata that defined a type. An original version of a fragment of a WSDL description, e.g. of a Web service, is of the form:

```
<s:schema elementFormDefault="qualified"
    targetNamespace="http://hp.org/">
    <s:include schemaLocation="./XMLSchema1.xsd"/>
    <s:element name="EchoBase">
        <s:complexType>
            <s:sequence>
                <s:element minOccurs="0" maxOccurs="1"
                name="c" type="myns:MyCls"/>
                <s:element minOccurs="0" maxOccurs="1"
                name="c2"
    type="myns: MyCls2"/>
            </s:sequence>
        </s:complexType>
    </s:element>
</s:schema>
```

The WSDL description includes the XSD document XMLSchema1.xsd. The types MyCls and MyCls2 are defined in an original version of XMLSchema1.xsd:

```
<s:schema id="XMLSchema1"
        targetNamespace="http://hp.org/"
        elementFormDefault="qualified"
        xmlns="http://hp.org/Types.xsd"
        xmlns:mstns="http://hp.org/Types.xsd"
        xmlns:s="http://www.w3.org/2001/XMLSchema">
    <s:complexType name="MyCls">
        <s:sequence>
            <s:element minOccurs="0" maxOccurs="1"
            name="i1" type="s:int" />
        </s:sequence>
    </s:complexType>
    <s:complexType name="MyCls2">
        <s:sequence>
            <s:element minOccurs="0" maxOccurs="1"
            name="s1" type="s:string" />
        </s:sequence>
    </s:complexType>
</s:schema>
```

In the above original version of the XSD specification, MyCls is defined as an integer, and MyCls2 as a string.

A modification may be made wherein the WSDL description is changed to:

```
<s:schema elementFormDefault="qualified"
    targetNamespace="http://hp.org/">
        <s:include schemaLocation="./XMLSchema1.xsd"/>
        <s:include schemaLocation="./XMLSchema2.xsd"/>
        <s:element name="EchoBase">
            <s:complexType>
                <s:sequence>
                    <s:element minOccurs="0" maxOccurs="1"
                    name="c" type="myns:MyCls"/>
                    <s:element minOccurs="0" maxOccurs="1"
                    name="c2" type="myns:MyCls2"/>
                </s:sequence>
            </s:complexType>
        </s:element>
</s:schema>
```

In the modified WSDL description, the XSD documents XMLSchema1.xsd and XMLSchema2.xsd are included.

The type MyCls is defined in a modified version of XMLSchema1.xsd:

```
<s:schema id="XMLSchema1"
        targetNamespace="http://hp.org/"
        elementFormDefault="qualified"
        xmlns="http://hp.org/Types.xsd"
        xmlns:mstns="http://hp.org/Types.xsd"
        xmlns:s="http://www.w3.org/2001/XMLSchema">
    <s:complexType name="MyCls">
            <s:sequence>
                <s:element minOccurs="0" maxOccurs="1"
                name="i1" type="s:int" />
            </s:sequence>
    </s:complexType>
</s:schema>
```

The type MyCls2 is defined in a new XSD document XMLSchema2.xsd:

```
<s:schema id="XMLSchema2"
        targetNamespace="http://hp.org/"
        elementFormDefault="qualified"
        xmlns="http://hp.org/Types.xsd"
        xmlns:mstns="http://hp.org/Types.xsd"
        xmlns:s="http://www.w3.org/2001/XMLSchema">
    <s:complexType name="MyCls2">
        <s:sequence>
            <s:element minOccurs="0" maxOccurs="1" name="s1"
type="s:string" />
        </s:sequence>
    </s:complexType>
</s:schema>
```

In the above first example, no change in functionality with regard to an outside client application is detected. Every object that was defined in the original version of the XML schema is defined in the modified version. The only difference is that the complex types MyCls and MyCls2 were originally defined in a single XSD document, and after the modification are defined in separate XSD documents. In the modified version, both of the separate XSD documents are included in the modified WSDL description.

Thus, no change may be required in exchanging data of type MyCls or MyCls2 with an outside client application of a composite application. Thus, the modification may be evaluated as presenting a low risk of affecting a composite application that incorporates the modification. Were the comparison to be based on comparison of strings in the XSD documents alone, such a modification, involving a large number of character strings, could have been prominently marked.

The following second example illustrates a case where a defined type is renamed. An original version of an XSD document defines a complex type that is named "Data":

```
<xs:schema xmlns:tns="http://tempuri.org/"
    elementFormDefault="qualified"
        targetNamespace="http://tempuri.org/"
    xmlns:xs="http://www.w3.org/2001/XMLSchema">
        <xs:element name="HelloWorld">
            <xs:complexType>
                <xs:sequence>
                    <xs:element minOccurs="0" maxOccurs="1"
name="data" type="tns:Data"/>
                </xs:sequence>
            </xs:complexType>
        </xs:element>
        <xs:complexType name="Data">
            <xs:sequence>
                <xs:element minOccurs="0" maxOccurs="1"
name="WorldName" type="xs:string" />
            </xs:sequence>
        </xs:complexType>
</xs:schema>
```

The XSD document may be modified as follows:

```
<xs:schema xmlns:tns="http://tempuri.org/"
    elementFormDefault="qualified"
    targetNamespace="http://tempuri.org/"
    xmlns:xs="http://www.w3.org/2001/XMLSchema">
        <xs:element name="HelloWorld">
            <xs:complexType>
                <xs:sequence>
                    <xs:element minOccurs="0" maxOccurs="1"
name="data" type="tns:Data_Renamed" />
                </xs:sequence>
            </xs:complexType>
        </xs:element>
        <xs:complexType name="Data_Renamed">
            <xs:sequence>
                <xs:element minOccurs="0" maxOccurs="1"
name="WorldName" type="xs:string" />
            </xs:sequence>
        </xs:complexType>
</xs:schema>
```

In the above second example, the complex type that was named "Data" in the original version is named "Data_Renamed" in the modified version. The change is made both when the complex type is defined and when an element of the defined type is incorporated into the element "HelloWorld." Otherwise, the modified XSD document is identical to the original XSD document.

Thus, in the above second example, there is no change in functionality with regard to an outside client application. A client referencing the "HelloWorld" element would not be required to make any modifications in order to preserve functionality. Thus, such a modification may be evaluated as presenting a low risk of affecting a composite application that incorporates the modification. Again, a comparison to be based on comparison of strings alone would not have been capable of indicating the relative insignificance of the modification.

In the following third example, a modification adds documentation (annotation) to the XSD document. The original version of an XSD document does not include annotation:

```
<xs:schema xmlns:tns="http://tempuri.org/"
elementFormDefault="qualified"
    targetNamespace="http://tempuri.org/"
    xmlns:xs="http://www.w3.org/2001/XMLSchema">
        <xs:element name="EchoArr">
            <xs:complexType>
                <xs:sequence>
                    <xs:element minOccurs="0" maxOccurs="unbounded" name="int02" type="xs:int"/>
                </xs:sequence>
            </xs:complexType>
        </xs:element>
</xs:schema>
```

In a modified version of the XSD document, annotation is added:

```
<xs:schema xmlns:tns="http://tempuri.org/"
elementFormDefault="qualified"
    targetNamespace="http://tempuri.org/"
    xmlns:xs="http://www.w3.org/2001/XMLSchema">
        <xs:element name="EchoArr">
            <xs:complexType>
                <xs:sequence>
                    <xs:annotation>
                        <xs:documentation>States in the Pacific
                        Northwest of US
                        </xs:documentation>
                    </xs:annotation>
                    <xs:element minOccurs="0" maxOccurs="unbounded" name="int02" type="xs:int"/>
                </xs:sequence>
            </xs:complexType>
        </xs:element>
</xs:schema>
```

In the above third example, with the exception of the added annotation, the original and modified versions of the XSD document are identical. Thus, in the above third example, there is no change in functionality with regard to an outside client application.

Thus, such a modification may be evaluated as presenting a low risk of affecting a composite application that incorporates the modification. Again, a comparison to be based on comparison of strings alone would not have been capable of indicating the significance or insignificance of the modification.

In the following fourth example, a modification includes adding an element in an XSD document. In the original version of the XSD document:

```
<xs:schema xmlns:tns="http://tempuri.org/"
    elementFormDefault="qualified"
    targetNamespace="http://tempuri.org/"
    xmlns:xs="http://www.w3.org/2001/XMLSchema">
        <xs:element name="HelloWorld">
            <xs:complexType>
                <xs:sequence>
                    <xs:element minOccurs="0" maxOccurs="1" name="worldName" type="xs:string" />
                </xs:sequence>
            </xs:complexType>
        </xs:element>
</xs:schema>
```

The defined sequence in the original version of the XSD document includes a single element "worldName." For example, the element "worldName" may describe an input to a user interface. In the following modified version of the XSD document, an additional element "worldChangedName" is added:

```
<xs:schema xmlns:tns="http://tempuri.org/"
elementFormDefault="qualified"
    targetNamespace="http://tempuri.org/"
    xmlns:xs="http://www.w3.org/2001/XMLSchema">
        <xs:element name="HelloWorld">
            <xs:complexType>
                <xs:sequence>
                    <xs:element minOccurs="0" maxOccurs="1" name="worldName" type="xs:string" />
                    <xs:element minOccurs="0" maxOccurs="1" name="worldChangedName" type="xs:string" />
                </xs:sequence>
            </xs:complexType>
        </xs:element>
</xs:schema>
```

However, in the definition of the added element "worldChangedName" includes an attribute "minOccurs," signifying a required minimum number of occurrences, with a value of zero. Thus, occurrence of the defined element "worldChangedName" is optional. Due to the element being optional, a change in functionality with regard to an outside client application is possible, but not mandatory. An outside application of the composite application may not recognize an element of the type "worldChangedName," but may not need to recognize such an element. Thus, in the above fourth example, the modification may be evaluated as presenting a medium risk of affecting a composite application that incorporates the modification.

In the following fifth example, an order of elements is changed. In the original version of the XSD document, two elements are defined, "worldName" having a type string, and "data" having a type "Data":

```
<xs:schema xmlns:tns="http://tempuri.org/"
elementFormDefault="qualified"
targetNamespace="http://tempuri.org/"
    xmlns:xs="http://www.w3.org/2001/XMLSchema">
        <xs:element name="HelloWorld">
            <xs:complexType>
                <xs:sequence>
                    <xs:element minOccurs="0" maxOccurs="1" name="worldName" type="xs:string" />
                    <xs:element minOccurs="0" maxOccurs="1" name="data" type="tns:Data"/>
                </xs:sequence>
            </xs:complexType>
        </xs:element>
</xs:schema>
```

In the above original version of an XSD document, the element "HelloWorld" includes the element "worldName" and the element "data". In the following modified version of the XSD document, the order is reversed:

```
<xs:schema xmlns:tns="http://tempuri.org/"
elementFormDefault="qualified"
targetNamespace="http://tempuri.org/"
xmlns:xs="http://www.w3.org/2001/XMLSchema">
```

```
        <xs:element name="HelloWorld">
            <xs:complexType>
                <xs:sequence>
                    <xs:element minOccurs="0" maxOccurs="1"
name="worldName" type="xs:string" />
                    <xs:element minOccurs="0" maxOccurs="1"
name="data" type="tns:Data"/>
                </xs:sequence>
            </xs:complexType>
        </xs:element>
        <xs:complexType name="Data">
            <xs:sequence>
                <xs:element              minOccurs="0" maxOccurs="1"
name="WorldNameCounter" type="xs:long" />
                <xs:element minOccurs="0" maxOccurs="1"
name="WorldName" type="xs:string" />
            </xs:sequence>
        </xs:complexType>
        </xs:element>
</xs:schema>
```

In the above fifth example, the modification has changed the order of elements in a sequence in the defined element "HelloWorld". Thus, a change in functionality with regard to an outside client application may be likely. For example, when two applications of a composite application exchange data that is related to the XSD document with one another, the exchanged data may be misinterpreted. Thus, in this above fifth example, the modification may be evaluated as presenting a high risk of affecting a composite application that incorporates the modification.

In the following sixth example, an attribute of an element that determines a minimum number of occurrences of the element has been changed. In the original version of the XSD document, the element "worldName" is optional (the minimum number of occurrences being set to zero, representing optional data):

```
    <xs:schema xmlns:tns="http://tempuri.org/"
    elementFormDefault="qualified"
        targetNamespace="http://tempuri.org/"
        xmlns:xs="http://www.w3.org/2001/XMLSchema">
        <xs:element name="HelloWorld">
            <xs:complexType>
                <xs:sequence>
                    <xs:element minOccurs="0" maxOccurs="1"
name="worldName" type="xs:string" />
                </xs:sequence>
            </xs:complexType>
        </xs:element>
</xs:schema>
```

In the following modified version of the XSD document, the minimum number of occurrences of the element "worldName" has been increased to one (equal to the maximum number of occurrences), thus making the element mandatory:

```
    <xs:schema xmlns:tns="http://tempuri.org/"
    elementFormDefault="qualified"
        targetNamespace="http://tempuri.org/"
        xmlns:xs="http://www.w3.org/2001/XMLSchema">
        <xs:element name="HelloWorld">
            <xs:complexType>
                <xs:sequence>
                    <xs:element minOccurs="1" maxOccurs="1"
name="worldName" type="xs:string" />
                </xs:sequence>
            </xs:complexType>
        </xs:element>
</xs:schema>
```

In the above sixth example, the modification changed the element "worldName" from optional to mandatory. Thus, a change in functionality with regard to an outside client application may be likely. For example, when two applications of a composite application exchange data that is related to the XSD document, one application may require defined data that the other does not. Thus, in this above sixth example, the modification may be evaluated as presenting a high risk of affecting a composite application that incorporates the modification.

In the following seventh example, an attribute of an element that determines a restriction of the data of an element has been changed. In the following original version of the XSD document, the value of an element "initials" is restricted to any three uppercase or lowercase alphabetic characters:

```
        <xs:element name="initials">
            <xs:simpleType>
                <xs:restriction base="xs:string">
                    <xs:pattern value="[a-zA-Z][a-zA-Z][a-zA-Z]"/>
                </xs:restriction>
            </xs:simpleType>
        </xs:element>
```

In the following modified version of the XSD document, the value of the element "initials" is further restricted to three uppercase characters only:

```
        <xs:element name="initials">
            <xs:simpleType>
                <xs:restriction base="xs:string">
                    <xs:pattern value="[A-Z][A-Z][A-Z]"/>
                </xs:restriction>
            </xs:simpleType>
        </xs:element>
```

In the above seventh example, the modification changed the permissible values of the element "initials." Thus, a change in functionality with regard to an outside client application may be likely. For example, when two applications of a composite application exchange data that is related to the XSD document, one application may require uppercase letters while the other also permits lowercase letters. Thus, in this above seventh example, the modification may be evaluated as presenting a high risk of affecting a composite application that incorporates the modification.

In an example of evaluation of modifications in XML schemas, a computer program application stored in non-volatile memory or a computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for evaluation of modifications in XML schemas.

The computer-readable medium may be a non-transitory computer-readable medium including any form or type of memory, and any computer-readable medium except for a transitory, propagating signal. In one implementation, external memory may be the non-volatile memory or computer-readable medium.

We claim:

1. A method comprising:
   obtaining a first XML schema and a second XML schema;
   with a processor, identifying one or more schema objects of each of the first XML schema and the second XML schema;
   comparing one of the identified schema objects of the first XML schema with one of the identified schema objects of the second XML schema;
   if a difference is detected between the compared schema objects, evaluating a risk of the detected difference affecting operation of a composite application incorporating the first schema or the second schema; and
   issuing a notification of the evaluated risk of the detected difference;
   wherein evaluating the risk comprises evaluating the risk in accordance with a predetermined rule.

2. The method of claim 1, wherein the first or second XML schema comprises an XML Schema Definition (XSD) document, a Web Services Description Language (WSDL) definition, or a Web Application Description Language (WADL) definition.

3. The method of claim 1, wherein one of the first and second XML schemas comprises an original version of an XML schema, and the other comprises a modified version of that XML schema.

4. The method of claim 1, wherein identifying a schema object comprises applying an XML Schema Object Model (SOM) to the first or second XML schema.

5. The method of claim 1, wherein comparing the identified schema objects comprises comparing names of objects to detect whether an named schema object is present in one, but not in the other, of the first and second XML schema.

6. The method of claim 1, wherein comparing the identified schema objects comprises comparing a name, type, or attribute of an element defined in the first or second XML schema.

7. The method of claim 1, wherein evaluating the risk comprises determining the effect of the detected difference on a type from which one of the compared objects inherits a property, or on a type that inherits a property from one of the compared objects.

8. A non-transitory computer readable medium having stored thereon instructions that when executed by a processor will cause the processor to:
   identify one or more schema objects of each of a first XML schema and a second XML schema;
   compare one of the identified schema objects of the first XML schema with one of the identified schema objects of the second XML schema;
   if a difference is detected between the compared schema objects, evaluate a risk of the detected difference affecting operation of a composite application incorporating the first schema or the second schema; and
   issue a notification of the evaluated risk of the detected difference;
   wherein evaluating the risk comprises evaluating the risk in accordance with a predetermined rule.

9. The non-transitory computer readable medium of claim 8, wherein the stored instructions further comprise instructions to cause the processor to identify one or more of the schema objects of each of the first XML schema and the second XML schema.

10. The non-transitory computer readable medium of claim 9, wherein the instructions to identify the schema objects comprise instructions to apply an XML SOM to the first or second XML schema.

11. The non-transitory computer readable medium of claim 8, wherein the first or second XML schema comprises an XML Schema Definition (XSD) document, a Web Services Description Language (WSDL) definition, or a Web Application Description Language (WADL) definition.

12. The non-transitory computer readable medium of claim 8, wherein one of the first and second XML schemas comprises an original version of an XML schema, and the other comprises a modified version of that same XML schema.

13. The non-transitory computer readable medium of claim 8, wherein the instructions to compare the schema objects comprise instructions to compare names of objects to detect whether a name of one of the identified schema objects is present in one, but not in the other, of the first and second XML schema.

14. The non-transitory computer readable medium of claim 8, wherein the instructions to compare the schema objects comprise instructions to compare a name, type, or attribute of an element defined in the first or second XML schema.

15. The non-transitory computer readable medium of claim 8, wherein the instructions to evaluate the risk comprise instructions to determine an effect of the detected difference on a type from which the one of the compared objects inherits a property, or on a type that inherits a property from one of the compared objects.

16. A system comprising:
   a processing unit in communication with a non-transitory computer readable medium, wherein the computer readable medium contains a set of instructions wherein the processing unit is designed to carry out the set of instructions to:
   identify one or more schema objects of each of a first XML schema and a second XML schema;
   compare one of the identified schema objects of the first XML schema with one of the identified schema objects of the second XML schema;
   if a difference is detected between the compared schema objects, evaluate a risk of the detected difference affecting operation of a composite application incorporating the first schema or the second schema; and
   issuing a notification of the evaluated risk of the detected difference;
   wherein evaluating the risk comprises evaluating the risk in accordance with a predetermined rule.

17. The system of claim 16, wherein the set of instructions further comprise instructions to cause the processor to:
   obtain the first XML schema and the second XML schema; and
   identify one or more schema objects of each of the first XML schema and the second XML schema.

18. The system of claim 16, wherein the instructions to issue the notification comprise instructions to display a decorated list that includes a display of the detected difference.

* * * * *